United States Patent Office 3,170,885
Patented Feb. 23, 1965

3,170,885
CATALYST AND PROCESS OF MAKING THE SAME
Jacque C. Morrell, 8 Oxford St., Chevy Chase, Md.
No Drawing. Filed Feb. 20, 1959, Ser. No. 794,535
8 Claims. (Cl. 252—435)

This invention relates to polymerization catalysts and more particularly to improvements in those types of polymerization catalysts which contain as their principal ingredients a phosphoric acid and a natural porous silica material. The latter material is generally referred to as kieselguhr or infusorial earth and sometimes also as diatomaceous earth. In its most specific aspect my invention relates to improvements of the compression strength and hardness, and in general the wearing qualities of such polymerization catalysts which is at present a most important problem.

The catalysts produced from such mixtures of phosphoric acid and porous silica material, after baking and/or drying the same, have proven to be the best available catalysts for the polymerization of normally gaseous olefins to produce liquid hydrocarbon components of high octane motor and aviation fuels. The polymerization process has for a great many years been one of the most useful and important in the economy of petroleum refining for the conversion of otherwise practically waste gases resulting from both thermal and catalytic cracking into valuable components of motor fuels. The catalyst itself is highly active for the purpose, but its outstanding weakness has been its poor wearing qualities and its tendency to crumble and to dust during handling and use. This results in a relatively short life and frequent turnover of catalyst with the attendant increased costs. Despite the many years that this problem has existed and the many attempts to solve it, no satisfactory solution has been available to the industry and it is a prime object of the present invention to relieve the refining industry of the problem.

The polymerization catalysts described in my Patents Nos. 2,586,582 and 2,713,560 consisting of kaolin and phosphoric acid were an improvement so far as wearing qualities were concerned but the sacrifice in activity was too great to be economically feasible. However, one solution of the problem is disclosed in copending applications which are continuations-in-part of the applications upon which these patents issued. The catalyst products of these applications consist in a very minor amount of kaolin combined with a major amount of a natural porous silica material such as kieselguhr and these in turn are combined with a much larger proportion of a phosphoric acid e.g. the latter may comprise from 75% to 85% and preferably in excess of 80% of the mixture. The final product is dried and baked. Thus a balance between wearing qualities and activity is achieved.

In my present application I have made further improvements wherein I employ a catalyst composition comprising the mineral bentonite and other similar but non-equivalent minerals such as montmorillonite and halloysite, the said additive minerals being present in relatively minor proportions, in combination with a natural porous silica material of the class consisting of kieselguhr, infusorial earth and diatomaceous earth and incorporating the latter mixture with the maximum amount of a phosphoric acid, up to 80% and above; to achieve the desired balance of catalyst hardness and compression strength on the one hand and the polymerizing activity of the phosphoric acid on the other hand at relatively low cost. Each of these additives including those employed in my prior applications and the additive minerals of the present application, namely, bentonite, montmorillonite and halloysite exerts its own individual characteristics both in the preparation of the catalyst and in its final properties and they are thus on a strictly non-equivalent basis. Moreover, I have discovered that the manner in which these individual materials are incorporated with the other materials or components as well as the materials themselves affect the quality of the final product. This further emphasizes the non-equivalency of the several additive materials employed by me.

In carrying out the objects of my invention I incorporate from about 3% to 5% at the low end of the range to from 10 to 15% (and not to exceed 20%) at the high end (based on the mineral mix) and preferably from about 5% to 10% of a mineral selected from the group consisting of bentonite, montmorillonite and halloysite with about 85% to 97% of kieselguhr, also referred to as infusorial earth or diatomaceous earth. The preferred composition of the final product which for example contains 20% of the mineral mixture referred to above and 80% of a phosphoric acid may contain from about 1% to 2% of the additive based on the total mixture or 5% to 10% of the additive based on the mineral mix, i.e. the kieselguhr plus the bentonite. Since as little as 2% on the mineral mix may show beneficial results in some cases the content on the final product may be even lower, e.g. about $\frac{1}{2}$%: At the other extreme of about 15% (on the mineral mix) and up to about 40% of the latter on the total mixture, the additive would not exceed 10% on the final product even in unusual cases and on the preferred mixture would be very considerably less. The mineral mix, i.e. the kieselguhr and additive (when mixed directly) are then admixed with from 60% to 85% (or more generally from 75% to 85%) of a phosphoric acid (calculated upon a basis of 100% phosphoric acid in the final mixture) and preferably in the range of 78% to 82% of the latter. In such cases the additive should be present to the extent of about 5 to 10% based on the mineral mix, or 1 to 2% based on the total. This mixture may then be extruded and cut to proper size after which it is dried or baked by heating preferably in stages to from 500 to 700° F. (and somewhat higher for the high acid contents) for about 4 hours or longer; generally 600° F. to 700° F. for phosphoric acid contents of less than 80% and 700° F. to 800° F. and higher for acid content above 80%.

Alternatively the dried product may be broken to size after drying, although the former procedure of extrusion is preferred.

With regard to the mineral additives, bentonite, montmorillonite and halloysite, i.e. the materials to be added directly to the phosphoric acid or to the kieselguhr and finally incorporated in the mixture, the following may be said to characterize them. In general, all of them are hydrated aluminum silicates (or alumino-silicic acids) and all of them have colloidal properties and tend to swell on being wetted with water; and all of them dissolve in hot hydrochloric acid and consequently dissolve or disperse almost completely in phosphoric acid especially on warming the mixture while stirring. In this respect these materials differ from both kaolin and kieselguhr.

Bentonite, which is preferred, is considered a type of clay mineral, consisting in part of montmorillonite, but having its own unique properties. It swells to many times its own volume in the presence of water and displays thixotropy and many other colloidal properties. It is a hydrated silicate sometimes variable in composition and color. The bentonites have a high absorptive power, absorbing several times its weight of water, and swelling in the process. Analysis shows it to be made up from about 54 to 80% of silica, 12 to 27% of alumina ($Al_2O_3$) together with small amounts of oxides of iron, calcium, magnesium and sodium. It is found in large deposits throughout the United States and Canada and is widely used in industry. Varieties are sometimes known by such names as Wilkinite and Ardmonite.

Montmorillonite is a hydrated aluminum silicate or alumino silicic acid corresponding to the general formula $Al_2O_3.4SiO_2.H_2O$ (with some reported variations). It occurs as a soft apparently amorphous material (sometimes reddish in color) with a reported refractive index of 1.50 and birefringence of 0.03. It is completely soluble in hydrochloric acid and similarly dissolves and disperses in phosphoric acid. Dry montmorillonite swells greatly in water; and is composed of hydrogels of silica and from these properties it is concluded that it is not a true clay.

Halloysite, while sometimes referred to as a clay mineral, acts like bentonite, i.e. it swells with water and is acid soluble, i.e. it is decomposed by acids and differs specifically from kaolin in this respect since the latter does not dissolve in this manner. It is a hydrated aluminum silicate or alumino-silicic acid which has been assigned the general formula of $Al_2O_3.3SiO_2.3H_2O$ (with some variations in reported formulas such as $$Al_4Si_4O_{22}H_{16}$$

It occurs as a creamy apparently amorphous material with a soapy feel. The specific gravity has been reported at about 2.1, and refractive index 1.53. Large deposits occur in Georgia and Missouri. In addition to having properties like bentonite, it is related to a number of minor minerals.

The principal characterstics and properties of these additive minerals, which are of importance in connection with the present invention, are that in addition to being hydrated aluminum silicates or alumino silicic acids they are of a colloidal character, swelling with water and particularly being almost or wholly soluble or dispersible in mineral acds. (Neither kaolin or kieselguhr have this property.)

In this connection while definitely not equivalent to the additive minerals, bentonite etc., which form the principal basis of this invention, other alumino silicic acid or hydrated aluminum silicate minerals which are substantially wholly or largely soluble in acids may be used as additives and thus may be considered a part of my inveniton in addition to those mentioned above. I have in mind particularly the group of hydrous silicates having a similar property of being soluble in acids but containing calcium and/or sodium in addition to aluminum and which are generally referred to as the zeolite group of minerals. These include, for example, among others: apophyllite, heulandite, analcite, natrolite and allophane. The latter is a natural aluminum silicate and similar artifically produced compounds may be included in my invention, although none of these are equivalent to those named above.

The group of additives with which my present invention is principally concerned, namely bentonite, montmorillonite and halloysite, as mentioned above, have the unique properties of dissolving in or being decomposed by acids generally including phosphoric acid. Therefore, unlike kaolin or kieselguhr, in general they cannot be mixed alone with varying proportions of phosphoric acid and later be extruded to form a polymerization catalyst. This property of dissolving and/or being decomposed by acids, particularly phosphoric acid, also makes it necessary to limit the proportions of the bentonite (and other additives mentioned herein) with respect to the proportions of phosphoric acid and kieselguhr as otherwise the physical characteristics of the resulting mixture will not permit extrusion and forming of the catalyst and in addition will cause excessive flowing and deformation of the product on heating. The use of bentonite and the other additives mentioned herein in connection with the present invention thus present critical aspects especially with regard to the relative proportions which may be employed in the preparation of my catalysts. On the other hand, even small additions of these substances may show beneficial results under some conditions and all of these factors influence and are therefore part of my present invention.

For example, I have found that when I employ more than about 20% of bentonite (and the other acid soluble alumino silicic acid minerals mentioned herein) together with kieselguhr, based on the mineral mix (i.e. about 4% to 5% of the total mixture), the final mixture with the phosphoric acid is entirely too fluid or too "moist" for proper working, such as extrusion, or heating without flowing and the like. However, by reducing the proportion to about 5% to 10% and in general (not more than about 15% on the high end and even less in some cases on the low end, i.e. about 3%) all on the mineral mix, i.e. about 1% to 2% on the total, a satisfactory mixture may be obtained. In connection with the tests on this particular question a standardized mixture of 72 parts of $H_3PO_4$ containing 40 parts of $P_2O_5$ and 30 parts of kieselguhr (all by weight) was used. These proportions would normally make up into a relatively "dry" and workable mix. The addition of about 1 to 3 parts by weight of bentonite gave good results but increasing the proportion of bentonite from about 4 to 8 parts gave a progressively more moist and unsatisfactory mixture, particularly for high phosphoric acid contents; e.g. between about 78 and 82%. When the phosphoric acid (calculated to 100% orthophosphoric) in the total mixture was reduced from 80% down to 70%, improved mixtures within the higher range of bentonite content (from the viewpoint of workability) could be obtained. However, this is not a generally satisfactory polymerization catalyst; and the sacrifice in activity is too great. On the low end of the scale, I have found that I may employ less than 1% of the additive based on the total mixture (e.g. about 3% of the mineral mix) where the acid content is less than about 78%, but above this the additive should preferably be added in an amount of 1% to 2% of the final mixture, i.e. about 5% to 10% of the mineral mix. It is to be understood that these examples are given by way of illustration only and are not to be considered as limiting the broad aspects of my invention.

I have found also that when I dissolve (or in general disperse) the bentonite, etc. in the phosphoric acid (preferably by warming the mixture while stirring) that I obtain a more satisfactory mixture for extrusion and in the subsequent drying and baking operations all of which affect the final product as well as the process. This procedure permits a wider range of proportions of the bentonite, kieselguhr and phosphoric acid to be employed with satisfactory results than would otherwise be the case if the bentonite were first mixed with the kieselguhr, in the same proportions, and then with the acid; or if the bentonite is worked in with the phosphoric acid and kieselguhr as a final step before extrusion and heating. Also not only does the procedure of mixing the bentonite direct with the phosphoric acid give a better mixture for extrusion and heating but it produces a superior product also with respect to hardness and compression strength. This procedure, because of the superior results obtained, also constitutes a part of my invention even though the latter two alternatives may also under some conditions be employed by me. Specific examples of this procedure were tested employing the proportions used in the table below with the aforesaid general observations and results.

As will be noted from all that has been stated above there is not only a great difference in composition of my present catalyst product from that of the patent (also referred to above), but there is at the same time a wholly unexpected and very great improvement in the hardness and compression strength of the catalyst containing essentially only the kieselguhr and phosphoric acid while at the same time retaining the high activity of the latter composition. The catalysts of the present invention are thus very greatly superior in all essential respects to those of the prior art, or those made essentially from kaolin and phosphoric acid, i.e. those of the patents referred to on any basis of comparison. This demonstrates both a novel composition as well as great utility over the prior art.

The porous silica (SiO$_2$) material, kieselguhr, as well as (infusorial earth and diatomaceous earth) are also quite different from kaolin both in chemical and physical characteristics and properties. They lack plasticity and the property of hardening which kaolin possesses. The latter (sometimes called china clay) is composed of silicon, oxygen and hydrogen corresponding to the general formula Al$_2$O$_3$.2SiO$_2$.2H$_2$O. It is derived from the weathering of feldspars. Kieselguhr (etc.) on the other hand, is made up of the skeletal remains of diatoms and is essentially SiO$_2$. The two materials also differ in crystal structure and X-ray pattern. In fact, there are no similarities between kaolin and kieselguhr so that a composition containing one of them is entirely different from the other. As pointed out also I disclose the use of kaolin in a copending application similarly (but non-equivalently) to bentonite, montmorillonite and halloysite to supply the deficiency in kieselguhr-phosphoric polymerization catalysts in respect of hardness and compression strength and wearing qualities or catalyst life in general; but the latter are entirely different and produce superior results.

The terms kieselguhr, infusorial earth and diatomaceous earth (also tripolite) are used interchangeably for example, in Hackh's Chemical Dictionary (1929), and all three terms are defined as a light earthy sedimentary rock consisting of the microscopic empty shells of diatoms. Infusorial earth, kieselguhr, diatomite, tripolite, diatomaceous earth-siliceous earth are similarly used interchangeably and are referred to as a fine powder composed of siliceous skeletons of diatoms sp. gr. 0.24–0.34 in Chemical and Technical Dictionary (1947) and similarly in Chemical and Engineering Dictionary (both by Chemical Publishing Co.). The terms are likewise used interchangeably in Webster's New Collegiate Dictionary (1951) (based on Webster's New International Dictionary); Winston's Simplified Dictionary, College Edition, 1938; and Practical Standard Dictionary, Funk and Wagnalls (1929), also the Merck Index, 1952 Edition, and others. These materials are likewise sold and used interchangeably under these several terms; the major portion of all of them being up to as high as 90% SiO$_2$ in the form of porous siliceous skeletal substances. Large deposits of these materials occur in various locations, e.g. California, Nevada, Oregon etc. As with all naturally occurring materials, the SiO$_2$ content and impurities show variations within the general class as well as within the individual deposits. The term kieselguhr, infusorial earth and diatomaceous earth and in general such naturally occurring porous siliceous materials will be used and referred to interchangeably and on an equivalent basis in connection with the present invention. Tests on various such products showed comparable results within the variations which might be expected, i.e. the presence of other substances in varying amounts besides the porous siliceous materials in the several types. These with the higher amounts of porous silica are preferred.

The various well known phosphoric acids (ortho, pyro and meta) as well as those less well known phosphoric acids (such as tetra-phosphoric) all come within the scope of my invention. These phosphoric acids are related to each other in that they may be formed by successive dehydration steps and conversely they may be made from phosphorous pentoxide by successive additions of the proper amounts of water to P$_2$O$_5$. Also the latter may be added to various concentrations of phosphoric acid, e.g. from 75% to 85% and higher and the resultant mixture may be assumed (as has been done in the prior art "to contain phosphorous pentoxide") that is to say that the latter has been added to the former. Alternatively the mixture may contain "a definite percentage of pyrophosphoric acid corresponding to the primary phase of dehydration of the orthophosphoric acid" or corresponding to the primary and secondary phases of hydration of the pentoxide. Meta phosphoric acid is also formed by the dehydration of ortho and pyrophosphoric acids or by the hydration of phosphorous pentoxide. Pyrophosphoric acid itself may be used at a temperature above its melting point of 140° F. but this is less desirable than the mixture. Therefore from the overall practical viewpoint and for convenience I prefer to use the orthophosphoric acid starting for example with the 85% commercial concentration (or diluting the latter as found desirable e.g. from 75% to 85%) to which has been added various proportions of P$_2$O$_5$ (generally to a thick syrupy consistency); as found suitable or necessary simultaneously to incorporate the necessary amount of phosphoric acid in the mixture and to obtain a material of proper consistency prior to forming and baking. It is desirable for maximum activity to incorporate the maximum amounts possible of phosphoric acid which will produce a mixture which can be readily extruded and heated without flowing or undue deformation of the mixture during heating. Phosphorous pentoxide dissolves readily in orthophosphoric acid of commercial grade generally about 85% concentration particularly at elevated temperatures so that it is only a question of adjustment to obtain the desired concentration of the acid in the catalyst e.g. about 80% or more by varying the concentration and amount of these two components, but of course, the other components must also be adjusted.

In order to ascertain readily the amounts of phosphoric acid present in the mixture especially for comparison I determine the percentages on the basis of 100% orthophosphoric acid irrespective of the concentration present during mixing and of the form in which it may be present in the final product after heating.

The heavy stiff paste or mixture made by mixing the various materials including the additives, i.e. the minerals bentonite, montmorillonite and halloysite referred to above; the porous silica material, i.e. the kieselguhr and the phosphoric acid may be formed into pellets or preferably by extrusion into suitable shapes and cut into proper sizes generally ⅛ to ¼" diameter and about ¼" length or otherwise formed, or the dried and baked material may be sized later.

The consistency of the mixture before drying may vary somewhat depending on the temperature of mixing, the relative proportions of the components including the specific additive, the kieselguhr and the relative amount and concentration of phosphoric acid. It is desirable in all cases that the proportions of the materials be adjusted so that the mixture is stiff enough to be formed by extrusion and dried or baked without flowing or too much deformation. The application of a relatively small amount of heat at low temperatures, e.g. about 150° F. to 200° F. after mixing assists in congealing and thickening the mixture if necessary to permit forming although this may generally be avoided by proper formulation of all the components; and even by adjustment of any one of the components after mixing, by adding one or the other as required.

The formed catalyst may be dried and/or baked at temperatures varying from about 500° F. to about 650° F. and higher for several hours and upwards, for example 4 hours, except where the phosphoric acid content is above 79.0%, e.g. from 79 to 81% in which case I may heat to temperatures from 650° F. to 800° F. and above. Preferably the heating is done in two stages, i.e. to about 200° F. to 250° F. for one half to three quarters hour and then to 600° F. to 650° F. for about three and one half to four hours. The same time schedule may be used for the higher temperatures. For some special cases, for example with very high acid contents of from 82 to 85%, I may employ temperatures progressively higher, for example from 800° F. to 900° F. (or higher as required) but generally the lower ranges suffice. However, theer is a definite correlation of the composition of my catalysts with temperatures and time of heating. The prior art polymerization catalysts generally require prolonged heating at temperatures up to and above 900° F. and in some cases require controlled rehydration of the baked catalysts which is generally more costly than my improved catalysts; except with those exceptions shown above.

My invention thus produces a greatly superior product, more economically. It corrects vital deficiencies in respect of wearing qualities such as hardness and compression strength in the prior art catalysts while at the same time retaining the higher activity of the latter.

When used for polymerizing normally gaseous olefins, the granules or particles of catalyst are generally placed in treating towers and the gases containing olefins are passed downwardly through the towers at temperatures of 400 to 500° F. and pressures of several hundred pounds, e.g. 100 to 350 lbs. per square inch when employing stabilizer refluxes which contain e.g. 10 to 35% of propene and butenes. With gas mixtures containing normal and isobutene to obtain mixed polymerization the temperature may be lower, e.g. 250 to 350° F. with pressure of 500 to 800 lbs. per square inch, other reactions may be similarly carried out. It may also be desirable to introduce some steam during the reaction to maintain the normal vapor pressure of the catalyst; or the gas may be saturated with water vapor.

To remove carbonaceous or hydrocarbonaceous materials which form and deposit during the treatment the catalysts are reactivated by superheated steam and/or air or oxygen at temperatures varying from 500° to 1000° F. dependent on the concentrations of oxygen. The steam concentration may be increased toward the end of the burning off period and then both steam and temperatures may be decreased towards the very end.

The specific examples shown in the table following are typical of the proportions of materials used and the properties of the resulting products although they should not be construed as limiting either as to specific materials or proportions within the broad scope and spirit of my invention.

*Example 10*

Tests corresponding to numbers 1 and 3 and 6 and 7 in the table made using montmorillonite and halloysite separately, and substituting the latter materials for bentonite, give results which are comparable to those shown in the table for these examples. The results are good in all cases but varied with the separate additives, and as would be expected with the varying conditions employed in the separate tests.

The table above shows the formulation and composition and in addition illustrates the characteristics of my improved polymerization catalysts particularly with respect to structural or compression strength and hardness (resistance to abrasion) both of which are indexes of the wearing qualities and hardness. The structural or compressive strength tests represent the total thrust in pounds using the proving ring method on prepared representative specimens of fairly uniform size and shape (approximately ⅝" to ¾" cube) and represent the average of several comparative determinations on each type. The hardness data were made employing the Mohs mineral scale which is conventional in determining the relative hardness of minerals. The hardness and compression strength of a standard containing 80% phosphoric acid and 20% kieselguhr (with no additive present) made under similar conditions, i.e. heating the mixture up to 600° F. for 4 hours showed a hardness of about 1 on the same scale and compression strength of 10 to 15. Heating the standard to between 700° F. and 800° F. for an additional hour increased these values (of a standard) for hardness to about 1+ and the compression strength to about 35.

While it is generally not necessary to heat to temperatures as high as the foregoing, I have found it to be so where the phosphoric acid content is greater than about 79 to 80%. In these cases I obtain a very considerable improvement (much greater than that shown by the standard) by heating the product between 700° F. and 800° F. and higher. For example, in Example 9 the improvement

TABLE I. BENTONITE ADDITIVE

|  | (1) | | (2) | | (3) | | (4) | | (5) | |
|---|---|---|---|---|---|---|---|---|---|---|
| Pts. by wt. of $H_3PO_4$ | 72.0 | | 72.0 | | 72.0 | | 72.0 | | 73.0 | |
| Pts. by wt. of $P_2O_5$ | 40.0 | | 40.0 | | 40.0 | | 40.0 | | 40.0 | |
| Equiv. of 100% $H_3PO$ | 116.6 | | 116.6 | | 116.6 | | 116.6 | | 117.3 | |
| Percent of 100% $H_3PO$ | | 78.0 | | 78.7 | | 79.0 | | 79.5 | | 79.5 |
| Pts. by wt. of kieselguhr | 30.0 | | 30.0 | | 29.0 | | 29.0 | | 29.0 | |
| Percent by wt. of kieselguhr | | 20.2 | | 20.2 | | 19.8 | | 19.8 | | 19.6 |
| Pts. by wt. of additive | 3.0 | | 1.5 | | 2.0 | | 1.2 | | 1.5 | |
| Percent of additive | | 2.0 | | 1.1 | | 1.4 | | 0.7 | | 1.0 |
|  | | 100.2% | | 100.0% | | 100.2% | | 100.0% | | 100.1% |
| Relative Hardness | 3− | | 2+ | | 2.5 | | 1.5 | | 2.0 | |
| Relative Compression Strength | 275 | | 225 | | 250 | | 160 | | 175 | |

|  | (6) | | (7) | | (8) | | (9) | |
|---|---|---|---|---|---|---|---|---|
| Pts by wt. of $H_3PO_4$ | 75.0 | | 75.0 | | 78.5 | | 78.5 | |
| Pts. by wt. of $P_2O_5$ | 42.0 | | 42.0 | | 44.0 | | 44.0 | |
| Equiv. of 100% $H_3PO$ | 122.0 | | 122.0 | | 127.7 | | 127.7 | |
| Percent of 100% $H_3PO$ | | 79.0 | | 80.0 | | 80.5 | | 80.0 |
| Pts. by wt. of kieselguhr | 30.0 | | 29.0 | | 29.0 | | 29.0 | |
| Percent by wt. of kieselguhr | | 19.5 | | 19.0 | | 18.3 | | 18.3 |
| Pts. by wt. of additive | 2.5 | | 1.5 | | 1.5 | | 2.5 | |
| Percent of additive | | 1.6 | 1.0 | 1.0 | | 1.0 | | 1.6 |
|  | | 100.1% | | 100.0% | | 99.8% | | 99.9% |
| Relative Hardness | 2.5 | | 2.0 | | 2.0 | | 2.5 | |
| Relative Compression Strength | 250 | | 200 | | 175 | | 250 | |

Preliminary heating of all products to 250° F. for about 1 hour. Nos. 1 to 3 inclusive subsequently heated to 600° F. for about 4 hours. Nos. 4 to 6 in the range of 600° F. to 700° F. for about 4 hours and Nos. 7, 8 and 9 were heated in the range between 700° F. and 800° F. for about 4 hours.

in compression strength by heating to the higher temperatures was over 50 points and the hardness was also very considerably improved. Moreover, I have found in these cases that the optimum additive (bentonite, etc.) content is between 5% and 10%.

With regard to polymerization activity the conventional method for the polymerization of propylene under controlled and comparable experimental conditions may be employed. The catalysts shown in the table vary within several percent only from the standard (about 97% to 101.0%) depending on the percentage of the additive; being in the lower range with the maximum additive and minimum phosphoric acid content shown in the table and highest with the minimum additive which produces the desired improvement in compression strength and hardness and maximum phosphoric acid content. These values are consistent with reported data on a standard polymerization catalyst containing about 80% phosphoric acid and 20% kieselguhr. The generally assigned activity of the latter is about 80. Additional phosphoric acid in the catalyst incorporated in the mixture may exceed the standard, although small differences may be negligible from a practical viewpoint considering the greatly increased value as a result of greatly increased hardness and compression strength and of the greatly prolonged life of the catalysts produced according to my invention.

The general procedure for producing catalysts with activities higher than the standard is to increase the phosphoric acid contents by increasing both the $H_3PO_4$ and $P_2O_5$. The latter may be varied considerably as it readily dissolves in the 85% phosphoric acid on warming. The heavy liquid resulting from increased $P_2O_5$ permits a somewhat reduced proportion of kieselguhr or increased proportion of total phosphoric acid while at the same time maintaining proper workability of the mixture. For the higher phosphoric acid contents the bentonite additive should be between about 5% and 10% of the mineral mixture (kieselguhr and bentonite) or between 1% and 2% of the total, and the heating temperature should be increased as shown above, i.e. correlated with the acid content.

It is, of course, necessary in these special cases to maintain a proper and fairly close balance in the relative amounts of the various components including the phosphoric acid, the phosphorous pentoxide, the bentonite and kieselguhr in order to obtain an initial mixture that is workable, i.e. may be readily extruded and at the same time does not flow or deform on heating and which at the same time will produce the desired hardness and compression strength while maintaining the activity of the final product.

In carrying out these formulations the sequence of mixing is a factor and as I have previously observed that the mixture responds better when the bentonite is added direct to the mixture of phosphoric acid and $P_2O_5$.

At the other end of the scale, I may when desired, increase the kieselguhr content of the catalyst or the additive or both and reduce the phosphoric acid content, e.g. from 70 to 75% (or more) to make a catalyst of lower acitvity but otherwise of very high compression strength and hardness. The lower range of this special type represents a type which might be used only in very special cases, but the upper range e.g. from 75% to 78% $H_3PO_4$ might find considerablye use, e.g. in alkylation. However, the ranges between 78% and 82% $H_3PO_4$ (with corrections for additive) are preferred as these would be most widely employed for normal operations of polymerizing olefin gases to produce high octane motor fuels.

It is also to be emphasized that while not the most desirable procedure, adjustments in proportions of the components may be made after the initial mixture is made to develop certain desired properties.

As also pointed out previously, the procedure of mixing the bentonite and other additives disclosed herein with the mixture of phosphoric acid and phosphorous pentoxide is a part of my invention and is preferred, for the reasons stated, over the procedure of mixing the bentonite and kieselguhr first and then with the phosphoric acid, or by mixing the kieselguhr and the phosphoric acid and then adding the bentonite. However, all of these methods may be used and under some conditions the latter alternatives may be desirable. Also as I have pointed out, the maximum proportions of bentonite relative to the phosphoric acid and kieselguhr for best results assume certain critical aspects and this is also part of my invention. Correlation of temperature and time of drying and/or baking with the phosphoric acid content of the mixture is also an important factor for best results in my process and catalyst product.

Moreover, it will be understood that there are many variations in initial concentrations of phosphoric acid, the percentages and amounts of phosphorous pentoxide, which may be incorporated therein; as well as the quality and proportions of kieselguhr and the additive required to give a mixture of the proper consistency to be extruded and to be heated without deformation or flowing of the material being heated, and at the same time to produce the requisite properties of activity, hardness and compressive strength. Also it must be understood that there are variations in composition of raw materials and for all of these factors as well as the temperatures and time periods for drying and/or baking, the necessary adjustments must be made.

It is to be further understood that some reaction occurs between the additives employed herein and the phosphoric acid, and therefore by the term additive as used in the claims I include the additives (bentonite, etc.) as such and/or their reaction products in terms of the amounts or percentages of additives used and referred to as such. In view of all of the above, I do not desire to be unduly limited by these factors except as they are within the broad spirit and scope of my invention.

This application is a continuation-in-part of my co-pending application, S.N. 780,272, Catalyst and Process of Making the Same, filed December 15, 1958, and now Patent No. 3,044,964.

I claim:

1. A polymerization catalyst comprising a dried mixture of a phosphoric acid and an inorganic support, said support consisting essentially of a natural porous silica material selected from the class consisting of kieselguhr, infusorial earth and diatomaceous earth and an additive selected from the group consisting of bentonite, montmorillonite and halloysite, the said phosphoric acid comprising about 70% to 85% of the said mixture, said support containing not less than about 80% of the said natural porous silica material and less than about 20% and more than 1% of said additive, said support being further characterized in that the said porous silica material together with said additive comprises not more than about 30% of the mixture.

2. A polymerization catalyst comprising a dried mixture of a phosphoric acid and an inorganic support, said support consisting essentially of a natural porous silica material selected from the class consisting of kieselguhr, infusorial earth and diatomaceous earth and an additive selected from the group consisting of bentonite, montmorillonite and halloysite, the said phosphoric acid comprising about 75% to 85% of the said mixture, said support containing in the range of about 85% to 97% of the said porous silica material and in the range of 3% to 15% of said additive, said support being further characterized in that the said porous silica material together with said additive comprises less than about 25% of the mixture.

3. A polymerization catalyst comprising a dried mixture of a phosphoric acid and a mineral support, said support consisting essentially of a material selected from the class consisting of kieselguhr, infusorial earth and diatomaceous earth and an additive selected from the group consisting of bentonite, montmorillonite and halloysite, the said phosphoric acid comprising about 75% to 85% of the said mixture, said support containing not less than about 80% of the said material selected from the class consisting of kieselguhr, infusorial earth and diatomaceous earth and less than about 20% and more than 3% of said additive, said support being further characterized in that the said material selected from the class consisting of kieselguhr, infusorial earth and diatomaceous earth together with said additive comprises not more than about 25% of the mixture.

4. A polymerization catalyst comprising a dried mixture of a phosphoric acid and a mineral support, said support consisting essentially of a material selected from the class consisting of kieselguhr, infusorial earth and diatomaceous earth and an additive consisting essentially of bentonite, the said phosphoric acid comprising about 75% to 85% of the said mixture, said support containing not less than about 80% of the said material selected from the class consisting of kieselguhr, infusorial earth and diatomaceous earth and less than about 20% and more than 3% of said additive, said support being further characterized in that the said material selected from the class consisting of kieselguhr, infusorial earth and diatomaceous earth together with said additive comprises not more than about 25% of the mixture.

5. A polymerization catalyst comprising a dried mixture of a phosphoric acid and a mineral support, said support consisting of a material selected from the class consisting of kieselguhr, infusorial earth and diatomaceous earth and an additive consisting essentially of montmorillonite, said phosphoric acid comprising about 75% to 85% of the said mixture, said support containing not less than about 80% of the said material selected from the class consisting of kieselguhr, infusorial earth and diatomaceous earth and less than about 20% and more than about 3% of said additive, said support being further characterized in that the said material selected from the class consisting of kieselguhr, infusorial earth and diatomaceous earth together with said additive comprises not more than about 25% of the mixture.

6. A polymerization catalyst comprising a dried mixture of a phosphoric acid and a mineral support, said support consisting of a material selected from the class consisting of kieselguhr, infusorial earth and diatomaceous earth and an additive consisting essentially of halloysite, said phosphoric acid comprising about 75% to 85% of the said mixture, said support containing not less than about 80% of the said material selected from the class consisting of kieselguhr, infusorial earth and diatomaceous earth and less than about 20% and more than about 3% of said additive, said support being further characterized in that the said material selected from the class consisting of kieselguhr, infusorial earth and diatomaceous earth together with said additive comprises not more than about 25% of the mixture.

7. An improved polymerization catalyst comprising a dried mixture of a phosphoric acid and an inorganic support, said support consisting essentially of a porous natural silica material selected from the group consisting of kieselguhr, infusorial earth and diatomaceous earth and of an additive selected from the group consisting of bentonite, montmorillonite, and halloysite reactive with said phosphoric acid, the said additive being present in an amount of about 3% to 20% of the said inorganic support and less than about 10% of the total mixture, the said phosphoric acid comprising about 75% to about 85% of the total mixture and the remaining component of the said catalyst consisting essentially of said porous natural silica material.

8. A polymerization catalyst comprising a dried mixture of phosphoric acid and an inorganic support, said support consisting essentially of a natural porous silica material and additives selected from the group consisting of bentonite, montmorillonite and halloysite, the said phosphoric acid comprising about 70 to 85% of the said mixture, said support containing not less than about 20% and more than 1% of said additive, said support being further characterized in that the said porous silica material together with said additive comprises not more than about 30% of the mixture, the said additive being first added directly to the phosphoric acid, and the resulting reaction mixture being thereafter admixed with the said porous silica, the mixture then being dried at an elevated temperature in excess of about 500° F. for a period of at least several hours.

References Cited in the file of this patent
UNITED STATES PATENTS

| | | |
|---|---|---|
| 2,018,065 | Ipatieff | Oct. 22, 1935 |
| 2,120,702 | Ipatieff | June 14, 1938 |
| 2,596,497 | Mavity | May 13, 1952 |
| 2,692,242 | Bielawski | Oct. 19, 1954 |
| 2,704,747 | Bielawski | Mar. 22, 1955 |
| 3,044,964 | Morrell | July 17, 1962 |
| 3,050,472 | Morrell | Aug. 21, 1962 |

OTHER REFERENCES

Iller, R. K.: "The Colloid Chemistry of Silica and Silicates," Cornell Univ. Press, Ithaca, N.Y., 1955, pp. 181–217 (pp. 181, 190–215 of particular interest).